US009831995B2

(12) United States Patent
Hwang et al.

(10) Patent No.: US 9,831,995 B2
(45) Date of Patent: Nov. 28, 2017

(54) METHOD AND APPARATUS FOR GENERATING PILOT PATTERN FOR MIMO ANTENNA

(71) Applicant: ELECTRONICS AND TELECOMMUNICATIONS RESEARCH INSTITUTE, Daejeon (KR)

(72) Inventors: Sung Hyun Hwang, Daejeon (KR); Seung Keun Park, Daejeon (KR); Hyung Do Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/931,551

(22) Filed: Nov. 3, 2015

(65) Prior Publication Data

US 2016/0127099 A1 May 5, 2016

(30) Foreign Application Priority Data

Nov. 3, 2014 (KR) .................. 10-2014-0151461
Oct. 20, 2015 (KR) .................. 10-2015-0145918

(51) Int. Cl.
*H04K 1/10* (2006.01)
*H04L 27/28* (2006.01)
*H04L 5/00* (2006.01)
*H04L 27/26* (2006.01)
*H04B 7/0413* (2017.01)

(52) U.S. Cl.
CPC .......... *H04L 5/0048* (2013.01); *H04L 5/0007* (2013.01); *H04L 5/0023* (2013.01); *H04L 27/2613* (2013.01); *H04B 7/0413* (2013.01)

(58) Field of Classification Search
CPC . H04L 5/0048; H04L 5/0007; H04L 27/2613; H04B 7/0413
USPC .................................................... 375/260, 346
See application file for complete search history.

(56) References Cited

U.S. PATENT DOCUMENTS

| 8,514,954 | B1* | 8/2013 | Yu | .......................... H04L 5/0048 |
|  |  |  |  | 375/260 |
| 2009/0257342 | A1* | 10/2009 | Lin | ...................... H04L 27/2613 |
|  |  |  |  | 370/208 |
| 2009/0274174 | A1 | 11/2009 | Hwang et al. |  |
| 2010/0254468 | A1 | 10/2010 | Kim et al. |  |
| 2011/0293037 | A1* | 12/2011 | Liu | .......................... H04L 5/001 |
|  |  |  |  | 375/295 |

OTHER PUBLICATIONS

Sung-Hyun Hwang et al., "MIMO Pilot for PHY Operation Mode 1," IEEE P802.22 Wireless RANs, Nov. 5, 2014, pp. 1-4, IEEE.

* cited by examiner

*Primary Examiner* — Phuong Phu

(57) ABSTRACT

Disclosed are a method for generating a pilot pattern and an apparatus thereof. The method for generating a pilot pattern for MIMO antennas includes: determining a size of a slot that is an interval where a pilot pattern is repeated in a time domain and a frequency domain; determining a pilot inserting position of OFDMA symbols included in a slot determined for a first antenna; and determining a pilot inserting position of OFDMA symbols included in a slot determined for a second antenna, in order to have a sub-carrier different from a sub-carrier of the pilot inserting position of the OFDMA symbols included in the slot determined for the first antenna.

20 Claims, 17 Drawing Sheets

METHOD AND APPARATUS FOR GENERATING PILOT PATTERN FOR MIMO ANTENNA

CROSS-REFERENCE TO RELATED APPLICATIONS

This application claims priority to and the benefit of Korean Patent Application No. 10-2014-0151461 filed in the Korean Intellectual Property Office on Nov. 3, 2014 and No. 10-2015-0145918 filed in the Korean Intellectual Property Office on Oct. 20, 2015 the entire contents of which are incorporated herein by reference.

BACKGROUND OF THE INVENTION

Field of the Invention

The present disclosure relates to a method and an apparatus for generating a pilot pattern for MIMO antenna.

Description of the Related Art

In a wireless communication system, since a channel environment exerts influence upon a received signal, it is necessary to compensate for the influence of the channel environment. To this end, in the wireless communication system, when data are transmitted between a transmission side and a reception side, a pilot symbol is inserted into a time domain and a frequency domain. The reception side may compensate for the channel distortion of the data symbol by performing channel estimation using the pilot symbol.

As a result, if an interval of the pilot symbol inserted between the data symbols is reduced, that is, if a density of the pilot symbol is increased, the channel estimation performance is improved. However, a ratio of the pilot symbol in a frame is increased so that the information transmission efficiency is deteriorated. Further, since the pilot has orthogonality for each antenna in a multiple input multiple output (MIMO) environment, a pilot pattern different from that of a single-antenna environment should be considered.

SUMMARY OP THE INVENTION

The present disclosure has been made in view of the above problems, and provides a method and an apparatus for generating a pilot pattern for MIMO antennas capable of minimizing degradation of channel estimation performance due to interpolation in a MIMO environment while reducing a density of the pilot.

In accordance with an aspect of the present disclosure, a method for generating a pilot pattern for MIMO antennas includes: determining a size of a slot that is an interval where a pilot pattern is repeated in a time domain and a frequency domain; determining a pilot inserting position of OFDMA symbols included in a slot determined for a first antenna; and determining a pilot inserting position of OFDMA symbols included in a slot determined for a second antenna, in order to have a sub-carrier different from a sub-carrier of the pilot inserting position of the OFDMA symbols included in the slot determined for the first antenna.

Determining a pilot inserting position of OFDMA symbols included in a slot determined for a second antenna includes: determining a reference pilot inserting position of a first OFDMA symbol included in the slot determined for the second antenna; and determining the pilot inserting position of the OFDMA symbols included in the slot determined for the second antenna based on the reference pilot inserting position.

The reference pilot inserting position has a sub-carrier different from a sub-carrier of a pilot inserting position of a first OFDMA symbol included in the slot determined for the first antenna.

Determining the pilot inserting position of the OFDMA symbols included in the slot determined for the second antenna based on the reference pilot inserting position includes: calculating a frequency-time distance to respective residual sub-carriers from pilots of all previous OFDMA symbols in the slot determined for the second antenna, with respect to the respective residual sub-carriers, which are sub-carriers except for a sub-carrier into which a pilot of all previous OFDMA symbols in the slot determined for the second antenna is inserted and a sub-carrier of a pilot inserting position of the first antenna, of a current OFDMA symbol after a first OFDMA symbol in the slot determined for the second antenna; comparing minimum distances in each frequency-time distance set of the residual sub-carriers with each other; and determining a sub-carrier having a largest frequency-time minimum distance as a pilot inserting position of the current OFDMA symbol.

Until only one subcarrier having the largest frequency-time minimum distance is provided, comparing minimum distances in each frequency-time distance set of the residual sub-carriers with each other is repeated from a first minimum distance to a final minimum distance in each frequency-time distance set, and next frequency-time minimum distances are compared with each other with respect to sub-carriers having a same maximum value of a current frequency-time minimum distance.

The first minimum distance is a minimum value in the frequency-time distance set, and the final minimum distance is a maximum value in the frequency-time distance set.

The method further includes: calculating a frequency distance to respective sub-carriers having a same maximum value in a frequency direction from pilots of all previous OFDMA symbols in the slot determined for the second antenna, with respect to the sub-carriers having the same maximum value, when there are at least two sub-carriers having the same maximum value even in a case of comparing a final minimum distance in the frequency-time distance set; comparing minimum distances in the frequency distance set with each other; and determining a sub-carrier having the largest frequency minimum distance as a pilot inserting position.

Until only one subcarrier having the largest frequency minimum distance is provided, comparing minimum distances in the frequency distance set with each other is repeated from a first minimum distance to a final minimum distance in each frequency distance set, and next frequency minimum distances are compared with each other with respect to subcarriers having the same maximum value of a current frequency minimum distance.

The first minimum distance in the frequency distance set is a minimum value in the frequency distance set, and the final minimum distance in the frequency distance set is a maximum value in the frequency distance set.

The method further includes determining one of sub-carriers having the same maximum value of the final minimum distance in the frequency distance set as a pilot inserting position, when there are at least two sub-carriers having the same maximum value even in case of comparing the final minimum distance in the frequency distance set.

The frequency-time distance is a sum of distances to a frequency direction and a time direction from pilots of the previous OFDMA symbols to the respective residual sub-carriers.

In accordance with another aspect of the present disclosure, an apparatus for generating a pilot pattern for MIMO antennas includes: a slot determiner configured to determine a size of a slot that is an interval where a pilot pattern is repeated in a time domain and a frequency domain; and a pattern generator configured to determine a pilot inserting position of OFDMA symbols included in a slot determined for a first antenna, and to a pilot inserting position of OFDMA symbols included in a slot determined for a second antenna, in order to have a sub-carrier different from a sub-carrier of the pilot inserting position of the OFDMA symbols included in the slot determined for the first antenna.

The pattern generator determines a reference pilot inserting position of a first OFDMA symbol included in the slot determined for the second antenna, and determines the pilot inserting position of the OFDMA symbols included in the slot determined for the second antenna based on the reference pilot inserting position.

The reference pilot inserting position has a sub-carrier different from a sub-carrier of a pilot inserting position of a first OFDMA symbol included in the slot determined for the first antenna.

The pattern generator includes: a distance calculator configured to calculate a frequency-time distance to respective residual sub-carriers from pilots of all previous OFDMA symbols in the slot determined for the second antenna, with respect to the respective residual sub-carriers, which are sub-carriers except for a sub-carrier into which a pilot of all previous OFDMA symbols in the slot determined for the second antenna is inserted and a sub-carrier of a pilot inserting position of the first antenna, of a current OFDMA symbol after a first OFDMA symbol in the slot determined for the second antenna; a distance comparator configured to compare minimum distances in each frequency-time distance set of the residual sub-carriers with each other; and a position determiner configured to determine a sub-carrier having a largest frequency-time minimum distance as a pilot inserting position of the current OFDMA symbol.

Until only one subcarrier having the largest frequency-time minimum distance is provided, the distance comparator compares from a first minimum distance to a final minimum distance in each frequency-time distance set, and compares next frequency-time minimum distances with respect to sub-carriers having a same maximum value of a current frequency-time minimum distance.

The first minimum distance is a minimum value in the frequency-time distance set, and the final minimum distance is a maximum value in the frequency-time distance set.

The distance calculator calculates a frequency distance to respective sub-carriers having a same maximum value in a frequency direction from pilots of all previous OFDMA symbols in the slot determined for the second antenna, with respect to the sub-carriers having the same maximum value, when there are at least two sub-carriers having the same maximum value even in a case of comparing a final minimum distance in the frequency-time distance set, the distance comparator compares minimum distances in the frequency distance set with each other, and the position determiner determines a sub-carrier having the largest frequency minimum distance as a pilot inserting position.

Until only one subcarrier having the largest frequency minimum distance is provided, the distance comparator compares from a first minimum distance to a final minimum distance in each frequency distance set, and compares next frequency minimum distances with each other with respect to subcarriers having the same maximum value of a current frequency minimum distance.

The first minimum distance in the frequency distance set is a minimum value in the frequency distance set, and the final minimum distance in the frequency distance set is a maximum value in the frequency distance set.

The position determiner determines one of sub-carriers having the same maximum value of the final minimum distance in the frequency distance set as a pilot inserting position, when there are at least two sub-carriers having the same maximum value even in case of comparing the final minimum distance in the frequency distance set.

The frequency-time distance is a sum of distances to a frequency direction and a time direction from pilots of the previous OFDMA symbols to the respective residual sub-carriers.

The method and the apparatus for generating a pilot pattern for MIMO antennas according to an embodiment of the present disclosure can minimize the degradation of channel estimation performance due to interpolation in a MIMO environment while reducing a density of the pilot.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

In this specification, a pilot pattern may mean a pattern of arranging a pilot symbol in a time domain and a frequency domain.

Figure 1:
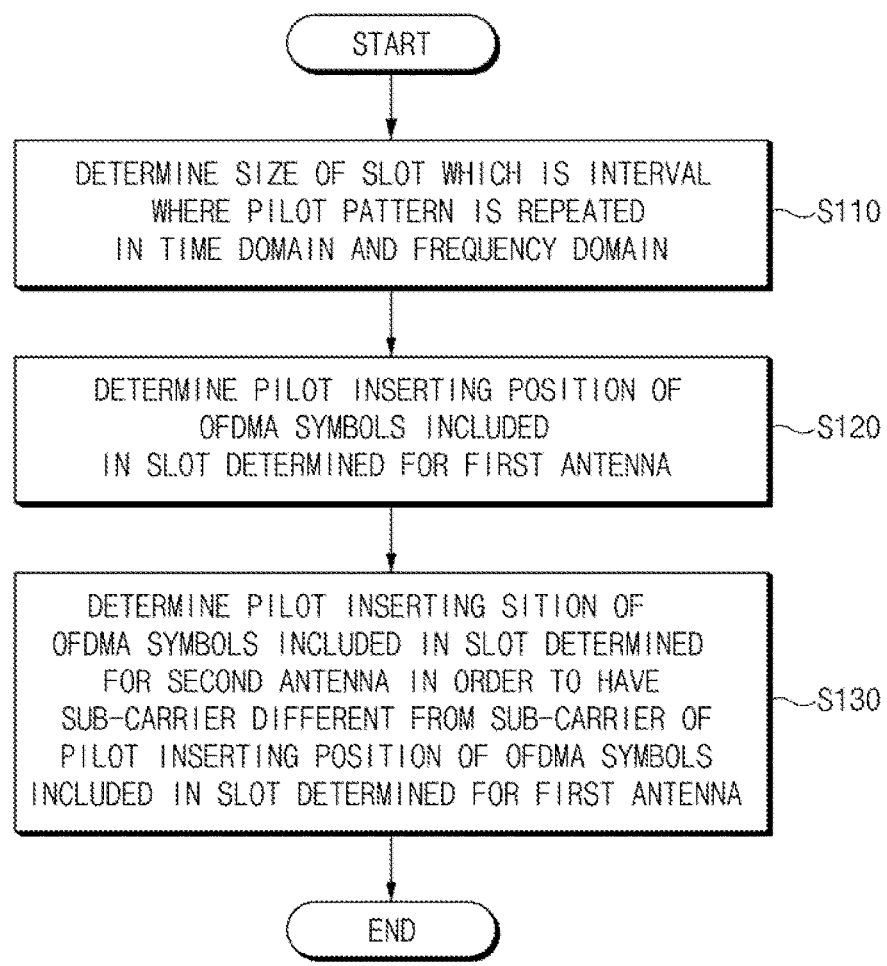
FIG. 1 is a flowchart illustrating a method of generating a pilot pattern for MIMO antennas according to an embodiment of the present disclosure.

FIG. 1 is a flowchart illustrating a method of generating a pilot pattern for MIMO antennas according to an embodiment of the present disclosure.

For example, the method of generating a pilot pattern according to an embodiment of the present disclosure shown in FIG. 1 may be performed by an apparatus for generating a pilot pattern for MIMO antennas provided to a transmitter of an OFDMA communication system.

Referring to FIG. 1, the method for generating a pilot pattern for MIMO antennas according to an embodiment of the present disclosure may include: determining a size of a slot which is an interval where a pilot pattern is repeated in a time domain and a frequency domain (S110), determining a pilot inserting position of OFDMA symbols included in a slot determined for a first antenna (S120), and determining a pilot inserting position of the OFDMA symbols included in a slot determined for a second antenna, in order to have a sub-carrier different from a sub-carrier of the pilot inserting position of the OFDMA symbols included in the slot determined for the first antenna (S130).

First, at step S110, the size of the slot for generating the pilot pattern may be determined. For example, the slot may be an interval where the pilot pattern is repeated in a time domain and a frequency domain, and may be defined by a frequency pilot interval where the pilot pattern is repeated in the frequency domain and a time pilot interval where the pilot pattern is repeated in the time domain. The size of the slot may be expressed by the sub-carrier number in the frequency domain and the OFDMA symbol number in the time domain included in the slot.

At step S120, a pilot inserting position of OFDMA symbols included in the slot determined for the first antenna may be determined. A procedure of determining the pilot inserting position with respect to the first antenna is described in detail with reference to FIG. 2 to FIG. 6.

At step S130, the pilot inserting position of OFDMA symbols included in a slot determined for the second antenna may be determined. The pilot inserting position of OFDMA symbols included in the slot determined for the second antenna may be determined by considering a pilot inserting position of the first antenna. For example, the pilot inserting position of OFDMA symbols included in the slot determined for the second antenna may have a sub-carrier different from a sub-carrier of the pilot inserting position of OFDMA symbols included in the slot determined for the first antenna. A procedure of determining the pilot inserting position with respect to the second antenna is described in detail with reference to FIG. 7 to FIG. 9.

Figure 2:
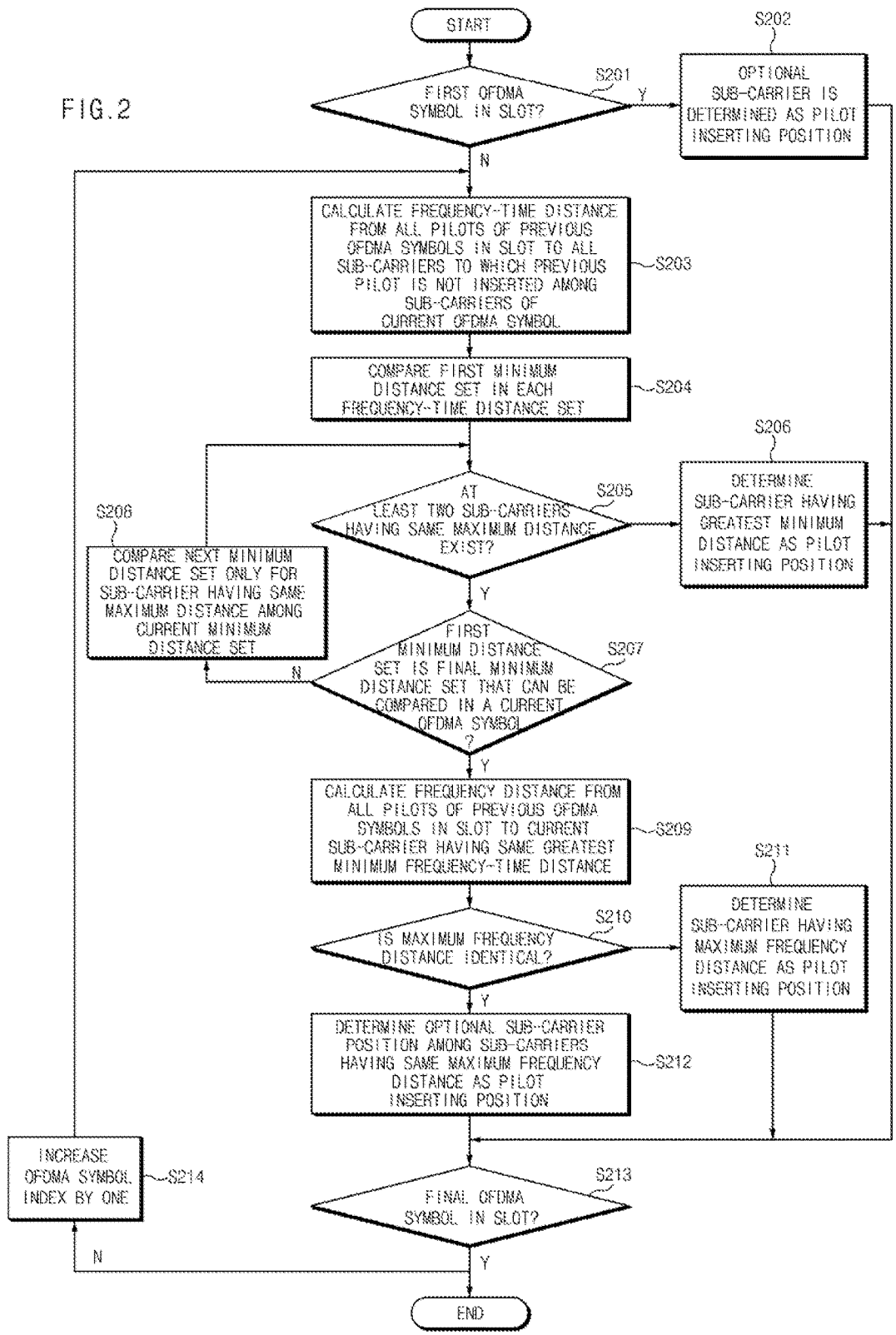
FIG. 2 is a flowchart illustrating a method of generating a pilot pattern for a first antenna shown in FIG. 1.

FIG. 2 is a flowchart illustrating a method of generating a pilot pattern for the first antenna shown in FIG. 1.

Referring to FIG. 2, a procedure of determining the pilot inserting position of OFDMA symbols included in the slot determined for the first antenna shown in FIG. 1 is described in detail.

First, it may be determined whether a current OFDMA symbol for determining the pilot inserting position is a first OFDMA symbol in the slot (S201).

When the current OFDMA symbol is a first OFDMA symbol in the slot, it may be determined that an optional sub-carrier in the symbol is determined as a pilot inserting position (S202). A pilot inserting position of each OFDMA symbol including the first OFDMA symbol may be a reference for determining a pilot inserting position of a next OFDMA symbol.

With respect to each OFDMA symbol from a second OFDMA symbol after the first OFDMA symbol in the slot, a distance to a frequency direction and a time direction, that is, a frequency-time distance, from all previous pilots with respect to all current residual sub-carriers except for a sub-carrier row to which a pilot of previous OFDMA symbols in the slot is inserted may be calculated (S203). In this case, the frequency-time distance may mean a sum of respective distances to the frequency direction and the time direction which is not a diagonal distance. In this case, a weight factor, which is applied when calculating each distance in the frequency direction and the time direction, may be differently applied according to a system and an environment. When calculating the frequency-time distance, the frequency-time distance may be calculated from a pilot inserting position which is closer to a current sub-carrier between two continuous pilots of a previous OFDMA symbol.

Distance values in each frequency-time distance set calculated from each sub-carrier may be compared with each other between residual sub-carriers, and a maximum sub-carrier may be determined as a pilot inserting position (S204 to S208).

For example, in a fourth OFDMA symbol, when the number of residual sub-carriers is four, since the frequency-time distance is calculated from each pilot of previous three OFDMA symbols (first symbol, second symbol, third symbol), each of four residual sub-carriers may have three frequency-time distance values. A set of three frequency-time distance values refers to a frequency-time distance set. Four values configured by selecting the smallest values among the frequency-time distance set of each four sub-carrier refers to a first minimum distance set. Further, four values configured by selecting secondly smallest values from the frequency-time distance set of each four sub-carrier refers to a second minimum distance set. Similarly, a third minimum distance set may be configured.

Referring back to FIG. 2, the first minimum distance set may be compared with each other in each frequency-time distance set (S204).

It may be determined whether there are at least two sub-carriers having the same maximum value (hereinafter, maximum distance) in the first minimum distance set (S205).

When there is one sub-carrier having the maximum distance in the first minimum distance set, the one sub-carrier may be determined as the pilot inserting position (S206).

If there are at least two sub-carriers having the same maximum distance in the first minimum distance set, it may be determined whether the first minimum distance set is a final minimum distance set that can be compared in a current OFDMA symbol (S207).

If it is not the final minimum distance set, the next minimum distance set may be compared only for the sub-carrier having the same maximum distance among the current minimum distance set (S208). The sub-carrier having the maximum distance may be determined as a next pilot inserting position (S206).

When there are at least two sub-carriers having the same maximum distance even in the case of repeatedly comparing up to the final minimum distance set, a distance (hereinafter, referred to as 'frequency distance') to a frequency direction from each pilot of all previous OFDMA symbols in each position of the at least two sub-carriers having the same maximum distance may be calculated (S209). This is because that it is preferable to compare the distance of the frequency direction when selecting a suitable pilot position as a change in the frequency direction is faster than a change in the time direction.

The frequency distances may be compared with each other (S210), and a sub-carrier having the maximum frequency distance may be determined as the pilot inserting position (S211). If there is at least one frequency distances of each sub-carrier, similarly to steps S204 to S208, the frequency distances of each sub-carrier are sequentially compared from the smallest frequency distance value. As a result of the comparison, a sub-carrier having a maximum value (hereinafter, referred to as 'maximum frequency distance') may be determined as a pilot inserting position.

For example, in the fourth OFDMA symbol, when the number of residual sub-carriers having the same maximum distance of a final minimum distance set of a frequency-distance set is two, since the frequency distance is calculated from each pilot of previous three OFDMA symbols (first, second, and third symbols), each of the two residual sub-carriers may have three frequency distance values.

A set of three frequency distance values refers to a frequency distance set. Two values obtained by selecting the smallest value in each frequency distance set of two sub-carriers one by one refers to a first frequency minimum distance set. Next, two values configured by selecting secondly smallest values from a frequency distance set of each of the two sub-carriers become a second frequency minimum distance set. Similarly, a third frequency minimum distance set may be configured.

Referring to FIG. 2, when there are at least two sub-carriers having the same maximum distance even in the case of comparing up to the final minimum distance set of a frequency distance set, one optional sub-carrier position among sub-carriers having the same maximum value may be determined as a pilot inserting position (S212).

It may be determined whether the current OFDMA symbol is a final OFDMA symbol in the slot (S213).

As a result of the determination of step S213, when the current OFDMA symbol is not the final OFDMA symbol in the slot, an OFDMA symbol index may be increased by one in order to determine the pilot inserting position for a next OFDMA symbol through step S203 to step S212 (S214). The step S203 to step S212 may be repeatedly performed up to the final OFDMA symbol in the slot.

FIG. 3 to FIG. 6 are diagrams illustrating a procedure of generating a pilot pattern for a first antenna in detail according to an embodiment of the present disclosure.

FIG. 3 to FIG. 6 illustrate a slot size 7, for convenience in illustration, including seven sub-carriers from a first sub-carrier (an a-th sub-carrier) to a seventh sub-carrier (a g-th sub-carrier) in the frequency domain and including seven OFDMA symbols from a first OFDMA symbol (m-th OFDMA symbol) to a seventh OFDMA symbol (s-th OFDMA symbol) in the time domain. However, the person of ordinary skill in the art can sufficiently recognize that the above method are applicable to a case where slot sizes in a frequency domain and a time domain are different from each other and a case where the slot size is different from 7.

Figure 3:
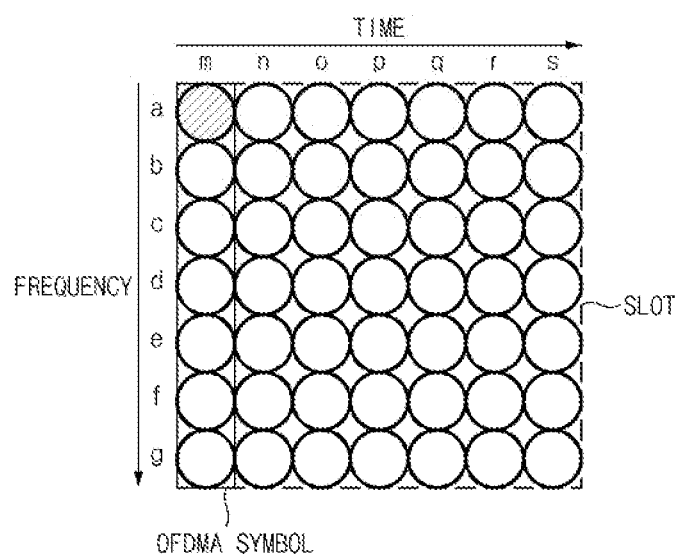
FIG. 3 to FIG. 6 are diagrams illustrating a procedure of generating a pilot pattern for a first antenna in detail according to an embodiment of the present disclosure.

First, referring to FIG. 3, a pilot inserting position of an m-th OFDMA symbol which is a first OFDMA symbol in the slot may be determined as an a-th sub-carrier which is an optional sub-carrier. A pilot inserted into the m-th OFDMA symbol may be repeatedly inserted in a frequency axis direction with a 7 sub-carrier interval.

Figure 4:
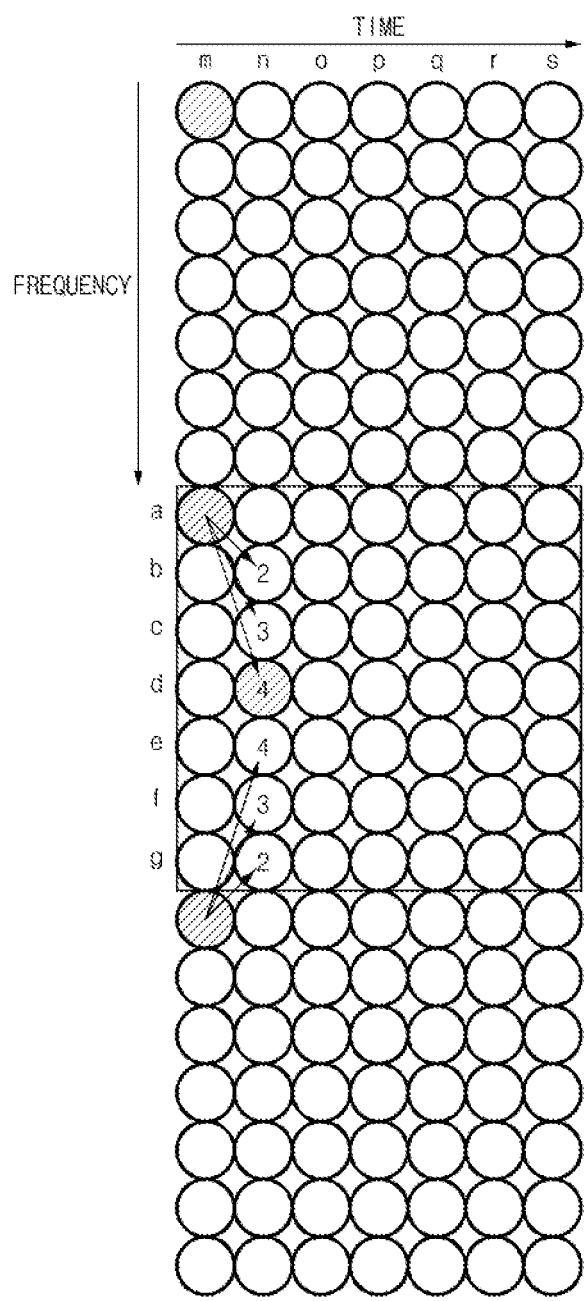

Referring to FIG. 4, in the n-th OFDMA symbol that is a second OFDMA symbol, b-th, c-th, d-th, e-th, f-th, and g-th sub-carriers, except for the a-th sub-carrier column that is a sub-carrier into which a pilot of the m-th OFDMA symbol that is a previous OFDMA symbol is inserted, may be a candidate position into which a second pilot is to be inserted.

A frequency-time distance between the a-th sub-carrier of the m-th OFDMA symbol that is a previous pilot position and the b-th sub-carrier of a current n-th OFDMA symbol becomes 2 by adding a distance (1) to the frequency domain to a distance (1) to the time domain. In the same manner, frequency-time distances from the a-th sub-carrier of the m-th OFDMA symbol that is the previous pilot position to the c-th, d-th, e-th, f-th, and g-th sub-carriers of the n-th OFDMA symbol becomes 3, 4, 4, 3, and 2, respectively. The calculation of the frequency-time distance in the e-th, f-th, and g-th sub-carriers of the n-th OFDMA symbol may use the closer lower pilot among two continuous upper and lower pilots of the m-th OFDMA symbol.

In the above example, although '1' is equally applied as a weight factor which is applied when calculating each distance in the frequency direction and the time direction, as described above, the weight factor may be differently applied according to a direction depending on a system and an environment.

Accordingly, frequency-time distance sets calculated in each of the b-th, c-th, d-th, e-th, f-th, and g-th sub-carrier of the n-th OFDMA symbol are (2), (3), (4), (4), (3), and (2) respectively, and have a single frequency-time distance respectively, such that a minimum distance set may be {2, 3, 4, 4, 3, 2}.

A sub-carrier having a maximum value, that is, a maximum distance in the minimum distance set may be the d-th and e-th sub-carriers having a distance of 4. Since the maximum distances of the d-th and e-th sub-carriers are equally 4 and there is no minimum distance set which can be compared, distances are calculated and compared only in the frequency domain from a previous pilot (the a-th sub-carrier of the m-th OFDMA symbol, or a sub-carrier spaced apart from the a-th sub-carrier of the m-th OFDMA symbol by a frequency pilot interval (i.e., a pilot of the m-th OFDMA symbol of the next slot) in the d-th and e-th sub-carrier positions.

In this case, since the frequency distances are equally 3, one of the d-th and e-th sub-carriers may be optionally selected and be determined as a sub-carrier into which the pilot is to be inserted. In an example of FIG. 4, the d-th sub-carrier of the n-th OFDMA symbol may be selected as the pilot position.

Figure 5:
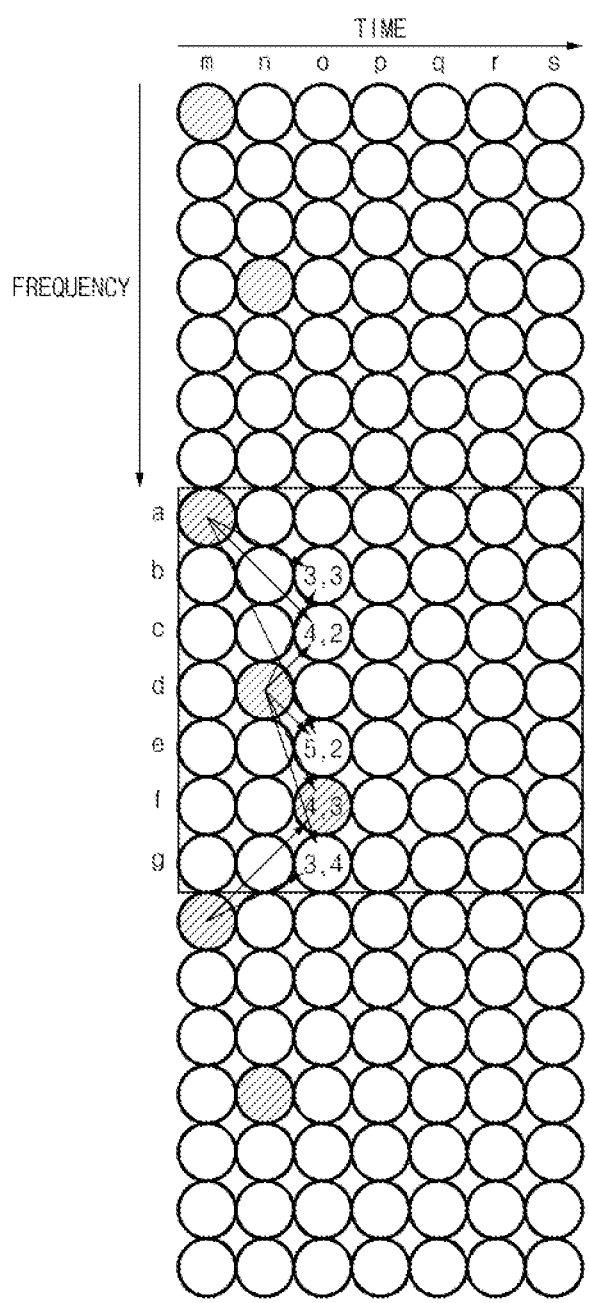

Referring to FIG. 5, in the o-th OFDMA symbol that is a third OFDMA symbol, the b-th, c-th, e-th, f-th, and g-th sub-carriers, except for the a-th and d-th sub-carrier column that are sub-carriers to which pilots of the m-th and n-th OFDMA symbols that are the previous OFDMA symbol are inserted respectively, become a candidate position to which a third pilot is to be inserted.

Frequency-time distances to the b-th, c-th, e-th, f-th, and g-th sub-carriers of the o-th OFDMA symbol from the pilot position of the m-th and n-th OFDMA symbols may be calculated to obtain (3,3), (4,2), (5,2), (4,3), and (4,3), respectively. Accordingly, the first minimum distance set may be {3, 2, 2, 3, 3} which are selected respectively, when 3 is a minimum value of a distance (3,3) to the b-th sub-carrier, 2 is a minimum value of a distance (4,2) to the c-th sub-carrier, 2 is a minimum value of a distance (5,2) to the e-th sub-carrier, 3 is a minimum value of a distance (4,3) to the f-th sub-carrier, and 3 is a minimum value of a distance (3,4) to the g-th sub-carrier. Among the first minimum distance set, a maximum distance may be the b-th, f-th, and g-th sub-carrier which are spaced apart by 3.

A sub-carrier having the maximum distance, that is, the maximum distance in the minimum distance set may be the b-th, f-th, and g-th sub-carriers having a distance of 3. Since the maximum distances of the b-th, f-th, and g-th sub-carriers are equally 3 and there is no minimum distance which can be compared, distances are calculated and compared only in the frequency domain from a previous pilot (the a-th sub-carrier of the m-th OFDMA symbol or a sub-carrier spaced apart from the a-th sub-carrier of the m-th OFDMA symbol by a frequency pilot interval (i.e., a pilot of the m-th OFDMA symbol of a next slot), the d-th sub-carrier of the n-th OFDMA symbol or a sub-carrier spaced apart from the d-th sub-carrier of the m-th OFDMA symbol by a frequency pilot interval (i.e., a pilot of the n-th OFDMA symbol of a next slot) in the b-th, f-th, and g-th sub-carriers positions.

Frequency-time distances to the b-th, f-th, and g-th sub-carriers of the o-th OFDMA symbol from the pilot position of the m-th and n-th OFDMA symbols may be calculated to be (1,2), (2,2), and (1,2), respectively. Accordingly, the first minimum distance set may be {1, 2, 1} which are selected respectively, when 1 is a minimum value of a distance (1,2) to the b-th sub-carrier, 2 is a minimum value of a distance (2,2) to the f-th sub-carrier, and 1 is a minimum value of a distance (1,2) to the g-th sub-carrier. Among the first minimum distance set, a maximum distance may be the f-th sub-carrier which is spaced apart by 2. Accordingly, a pilot inserting position of the o-th OFDMA symbol may become the f-th sub-carrier.

Figure 6:
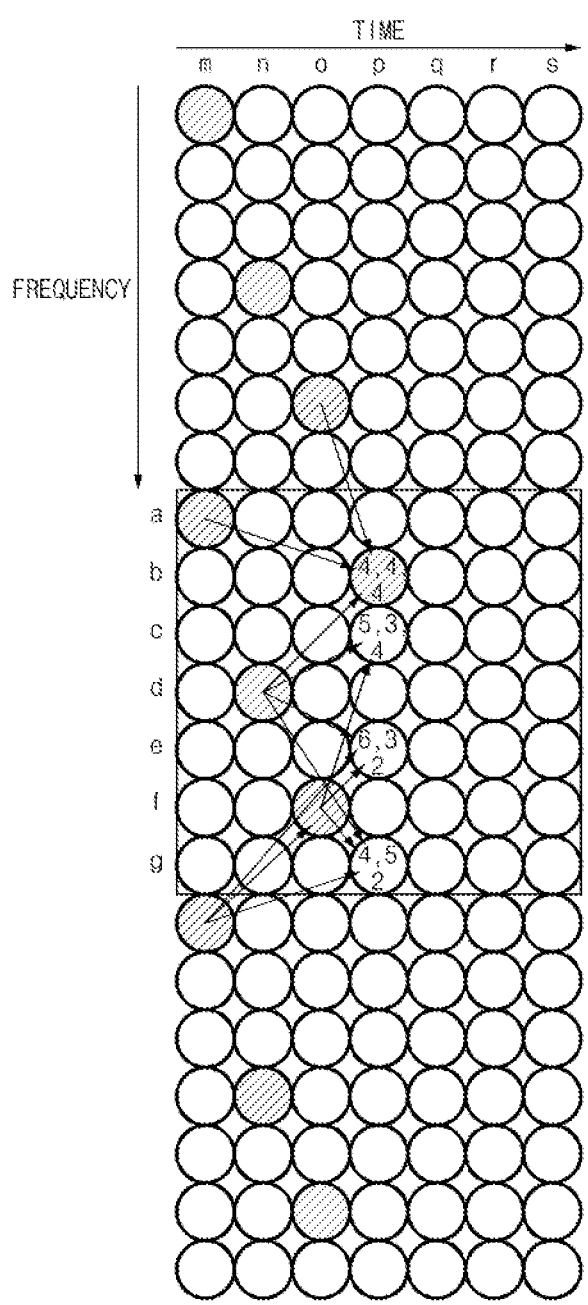

Referring to FIG. 6, in the p-th OFDMA symbol that is a fourth OFDMA symbol, the b-th, c-th, e-th, and g-th sub-carriers, except for the a-th, d-th, and f-th sub-carrier column that are sub-carriers to which pilots of the m-th, n-th, and o-th OFDMA symbols that are the previous OFDMA symbol are inserted, may become a candidate position to which a fourth pilot is to be inserted.

Frequency-time distances to the b-th, c-th, e-th, and g-th sub-carriers of the p-th OFDMA symbol from the pilot position of the m-th, n-th, and o-th OFDMA symbols may be sequentially calculated to be (4,4,4), (5,3,4), (6,3,2), and (4,5,2), respectively. Accordingly, the first minimum distance set is {4, 2, 2, 2} which are selected respectively, when 4 is a minimum value of a distance (4,4,4) to the b-th sub-carrier, 2 is a minimum value of a distance (5,3,4) to the c-th sub-carrier, 2 is a minimum value of a distance (6,3,2) to the e-th sub-carrier, and 2 is a minimum value of a distance (4,5,2) to the g-th sub-carrier. Among the first minimum distance set, the maximum distance may be the b-th sub-carrier which is spaced apart by 4. Accordingly, a pilot inserting position of the p-th OFDMA symbol may become the b-th sub-carrier.

Assuming that a channel environment is not significantly changed during a single slot, a pilot symbol of previous OFDMA symbols may be used in a final OFDMA symbol in the slot. Accordingly, since channel information may be duplicated from all sub-carrier positions to be used for channel estimation, performance degradation due to interpolation may be prevented. Since the channel information may be duplicated from all sub-carrier positions in the final OFDMA symbol, a maximum pilot interval may always satisfy one.

As described above, pilot inserting positions of OFDMA symbols included in the slot determined for the first antenna may be determined as the a-th, b-th, d-th, and f-th sub-carriers, respectively. Hereinafter, a procedure of determining a pilot inserting position of OFDMA symbols included in the slot with respect to the second antenna is described with reference to FIG. 7 to FIG. 9.

Figure 7:
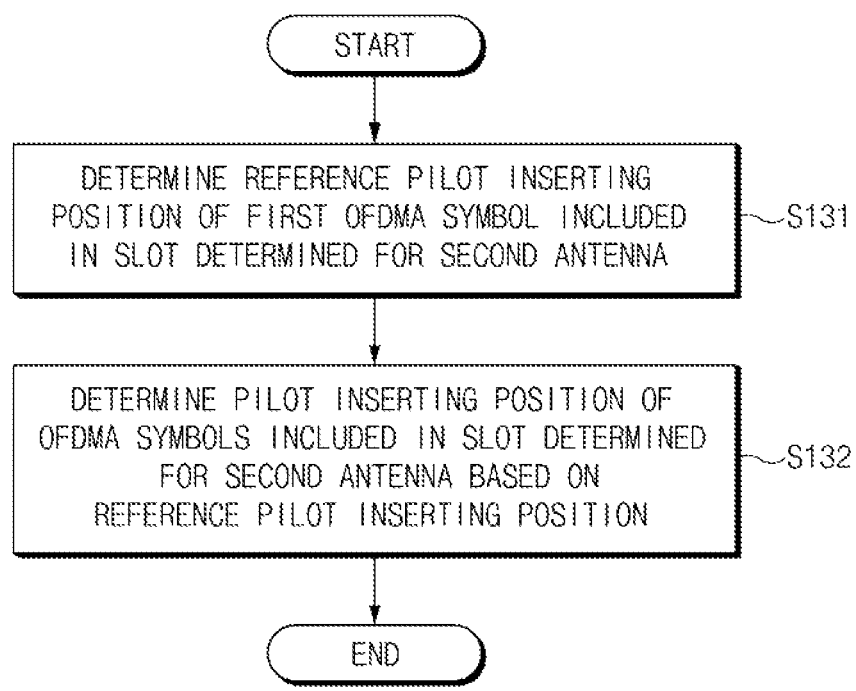
FIG. 7 is a flowchart illustrating a method of generating a pilot pattern for a second antenna according to an embodiment of the present disclosure.
Figure 8:
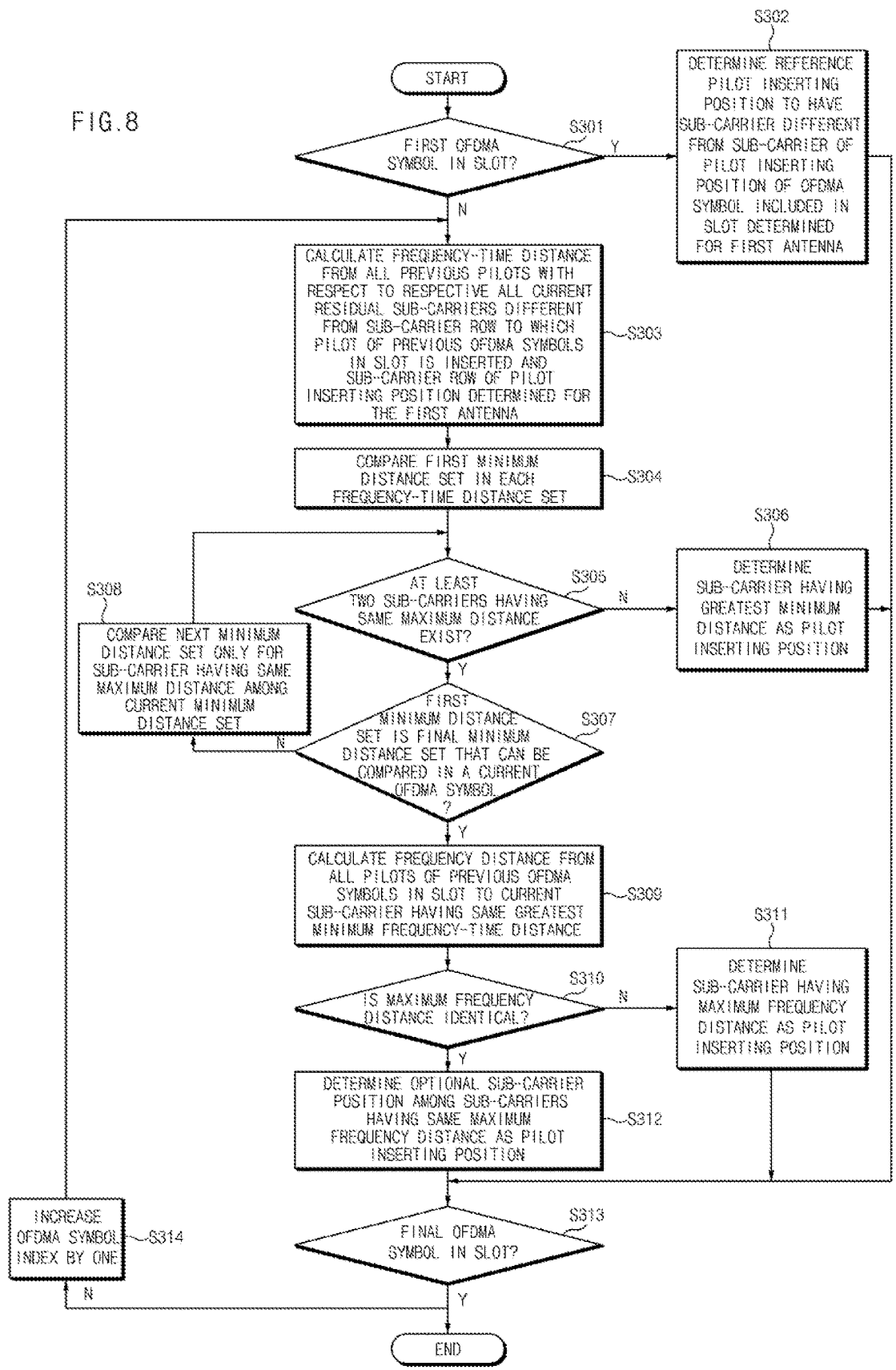
FIG. 8 is a flowchart illustrating a method of generating a pilot pattern for a second antenna shown in FIG. 7.

FIG. 7 is a flowchart illustrating a method of generating a pilot pattern for a second antenna according to an embodiment of the present disclosure. FIG. 8 is a flowchart illustrating the method of generating a pilot pattern for a second antenna shown in FIG. 7.

First, referring to FIG. 7, in order to have a sub-carrier different from a sub-carrier of the pilot inserting position of the OFDMA symbols included in a slot determined for the first antenna, the step (S130, see FIG. 1) of determining a pilot inserting position of the OFDMA symbols included in the slot determined for the second antenna may include: a step (S131) of determining a reference pilot inserting position of a first OFDMA symbol included in the slot determined for the second antenna, and a step (S132) of determining a pilot inserting position of OFDMA symbols included in the slot determined for the second antenna based on the reference pilot inserting position.

At step S131, the reference pilot inserting position of the first OFDMA symbol included in the slot determined for the second antenna may be determined to have a sub-carrier different from the pilot inserting position of the OFDMA symbol included in the slot determined for the first antenna.

At step S132, the pilot inserting position of the OFDMA symbol after the first OFDMA symbol included in the slot determined for the second antenna may be determined based on a position of the first OFDMA symbol.

Referring to FIG. 8, a procedure of determining the pilot inserting position of OFDMA symbols included in the slot with respect to the second antenna is shown in detail. The procedure of determining the pilot inserting position shown in FIG. 8 may be similar to a procedure of determining the pilot inserting position with respect to the first antenna.

First, it may be determined whether a current OFDMA symbol to determine the pilot inserting position is a first OFDMA symbol in the slot (S301).

When the current OFDMA symbol is the first OFDMA symbol in the slot, the reference pilot inserting position may be determined to have a sub-carrier different from a sub-carrier of the pilot inserting position of the OFDMA symbol included in the slot determined for the first antenna (S302). The reference pilot inserting position may be a reference for determining a pilot inserting position of the OFDMA symbols after the first OFDMA symbol.

With respect to each OFDMA symbol from a second OFDMA symbol after the first OFDMA symbol in the slot, a distance to a frequency direction and a time direction, that is, the frequency-time distance, from the all previous pilots with respect to respective all current residual sub-carriers different from a sub-carrier row to which a pilot of the previous OFDMA symbols in the slot is inserted and a sub-carrier row of the pilot inserting position determined for the first antenna may be calculated (S303). In this case, the frequency-time distance may be the same as the frequency-time distance which was illustrated with reference to FIG. 2.

Distance values in each frequency-time distance set calculated in each sub-carrier may be sequentially compared between residual sub-carriers, and a sub-carrier having a maximum distance value may be determined as the pilot inserting position (S304 to S314). The step S304 to step S314 may be substantially identical with the procedure of determining the pilot inserting position with respect to the first antenna which was illustrated with reference to FIG. 2.

Figure 9:
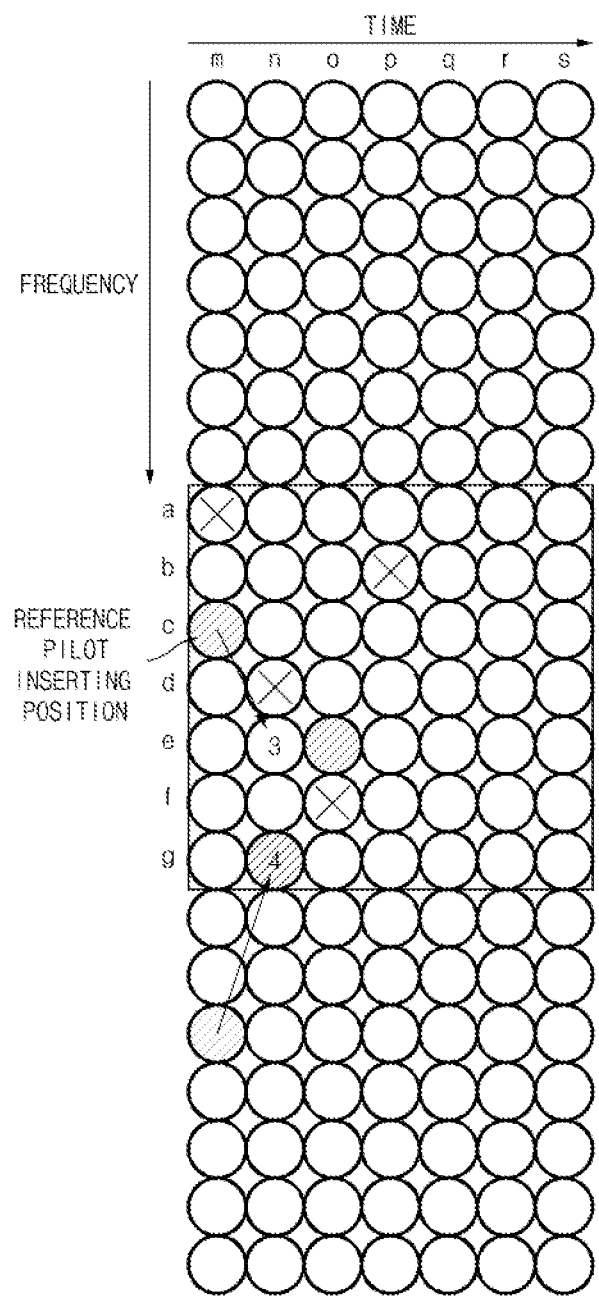
FIG. 9 is a diagram illustrating a procedure of generating a pilot pattern for a second antenna according to an embodiment of the present disclosure.

FIG. 9 is a flowchart illustrating a procedure of generating a pilot pattern for a second antenna according to an embodiment of the present disclosure.

Referring to FIG. 9, a pilot inserting position of an m-th OFDMA symbol that is the first OFDMA symbol in the slot determined for the second antenna may be determined as a sub-carrier different from a sub-carrier of the pilot inserting position determined for the first antenna. For example, the pilot inserting position (i.e., the reference pilot inserting position) of the m-th OFDMA symbol in the slot determined for the second antenna may be determined as one of the c-th, the e-th, and the g-th sub-carriers. In FIG. 9, the c-th sub-carrier may be determined as a reference pilot inserting position.

In the n-th OFDMA symbol that is the second OFDMA symbol, the e-th and g-th sub-carriers, except for an a-th sub-carrier row (i.e., the c-th sub-carrier) that is a sub-carrier into which a pilot of the m-th OFDMA symbol that is the previous OFDMA symbol is inserted and a sub-carrier row (i.e., a-th, b-th, d-th, and f-th sub-carriers) determined for the first antenna, may become a candidate position into which the second pilot is to be inserted.

Frequency-time distances to the e-th and g-th sub-carriers of a current n-th OFDMA symbol from the c-th sub-carrier of the m-th OFDMA symbol that is the previous pilot position may become 3 and 4, respectively.

Accordingly, the frequency-time distance set calculated from the e-th and g-th sub-carriers of the n-th OFDMA symbol may be (3) and (4) respectively, and may have a single frequency-time distance respectively, such that a minimum distance set may be {3, 4}.

A sub-carrier having a maximum value, that is, a maximum distance in the minimum distance set may be the g-th sub-carrier having a distance of 4. Accordingly, the pilot inserting position of the n-th OFDMA symbol may be determined as the g-th sub-carrier. In addition, in a case of the o-th OFDMA symbol, the final remaining e-th sub-carrier may be determined as the pilot inserting position.

As described above, in accordance with the method of generating a pilot pattern for MIMO antennas according to an embodiment of the present disclosure, since the pilot inserting position is determined in a different sub-carrier for each antenna and the pilot inserting position is determined based on a distance of the frequency domain and the time domain, data may be efficiently transmitted by maintaining a low pilot density, and, further, a channel estimation performance may be stably obtained as the performance degradation due to interpolation does not occur in a severe channel environment.

Figure 10:
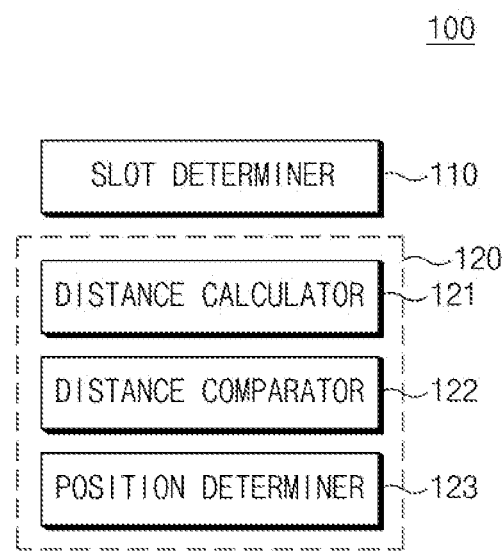
FIG. 10 is a block diagram illustrating an apparatus for generating a pilot pattern for MIMO antennas according to an embodiment of the present disclosure.

FIG. 10 is a block diagram illustrating an apparatus for generating a pilot pattern for MIMO antennas according to an embodiment of the present disclosure.

Referring to FIG. 10, the apparatus 100 for generating a pilot pattern for MIMO antennas according to an embodiment of the present disclosure may include a slot determiner 110 and a pattern generator 120.

The slot determiner 110 may determine the size of the slot which is an interval where the pilot pattern is repeated in the frequency domain and the time domain. The size of the slot may be selected according to a channel characteristic of a target system.

The pattern generator 102 may consider the pilot inserting position of each antenna when the pilot pattern is generated with respect to a plurality of antennas. For example, the pattern generator 102 may generate a pilot pattern so that pilot inserting positions of a plurality of antennas may have different sub-carriers.

The pattern generator 120 may include a distance calculator 121, a distance comparator 122, and a position determiner 123.

The distance calculator 121 may calculate a frequency-time distance from pilots of the previous OFDMA symbols in respective residual sub-carriers except for a sub-carrier to which pilots of the previous OFDMA symbols in the slot is inserted and/or a sub-carrier into which the pilot is inserted for other antenna, with respect to the OFDMA symbol after the first OFDMA symbol in the slot. In this case, the frequency-time distance may be defined as a sum of respective distances to the frequency axis and the time axis from pilots of the previous OFDMA symbols.

When there are at least two sub-carriers having the same maximum minimum distance after comparing up to a final minimum distance in the frequency-time distance set by the distance comparator 122 which is described later, the distance calculator 121 may calculate a frequency distance in a frequency direction from pilots of the previous OFDMA symbols in each of the at least two sub-carriers.

The distance comparator 122 may sequentially compare the distance from a first minimum distance to a final minimum distance in each frequency-time distance set of residual sub-carriers until it is possible to select a single sub-carrier having the maximum frequency-time minimum distance. The distance comparison may be accomplished by comparing a next frequency-time minimum distance only for the sub-carriers having the same maximum value of a current frequency-time minimum distance.

Further, when there are at least two sub-carriers having the same maximum minimum distance after comparing up to the final minimum distance in the frequency-time distance set, the distance comparator 122 may compare the frequency distance calculated in the distance calculator 121. Further, the frequency distance comparison may be sequentially accomplished also from the minimum distance in the frequency distance set, and a next frequency minimum distance may be compared only for the sub-carriers having the same maximum value of a current frequency minimum distance.

The position determiner 123 may determine the optional sub-carrier position or the sub-carrier position different from the pilot inserting position determined for other antenna as the pilot inserting position with respect to a first OFDMA symbol in the slot, and may determine the sub-carrier having the maximum frequency-time minimum distance as the pilot inserting position with respect to a second OFDMA symbol after the first OFDMA symbol. Further, when there are at least two sub-carriers having the same maximum frequency-time minimum distance even after comparing up to the final minimum distance in the frequency-time distance set, the position determiner 123 may determine the sub-carrier having the maximum frequency distance as the pilot inserting position. In addition, when there are at least two same sub-carriers up to the final frequency minimum distance, the position determiner 123 may determine an optional sub-carrier among the at least two sub-carriers as the pilot inserting position.

Figure 11A:
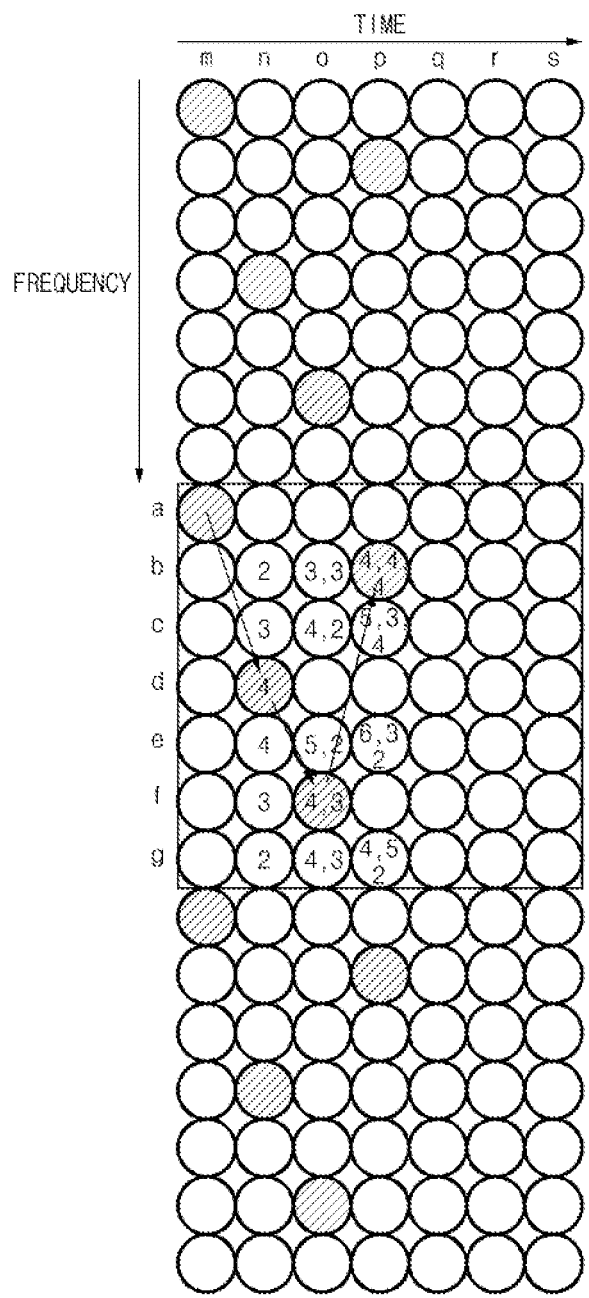
FIG. 11A and FIG. 11B are diagrams illustrating a procedure of generating a pilot pattern when the number of antennas according to an embodiment of the present disclosure is two.
Figure 11B:
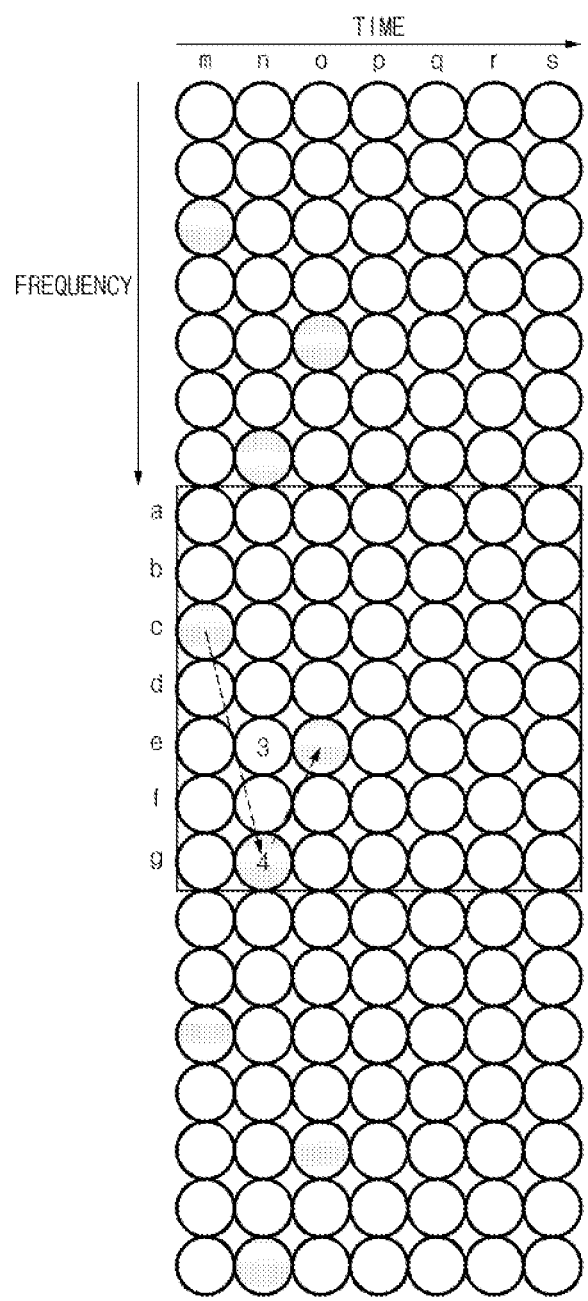

FIG. 11A and FIG. 11B are diagrams illustrating a procedure of generating a pilot pattern when the number of antennas according to an embodiment of the present disclosure is two.

First, referring to FIG. 11A, a procedure of generating a pilot pattern with respect to a first antenna is illustrated. As described above with reference to FIG. 3 to FIG. 6, the pilot inserting position of the m-th OFDMA symbol may be determined as the a-th sub-carrier, the pilot inserting position of the n-th OFDMA symbol may be determined as the d-th sub-carrier, the pilot inserting position of the o-th OFDMA symbol may be determined as the f-th sub-carrier, and the pilot inserting position of the p-th OFDMA symbol may be determined as the b-th sub-carrier.

Referring to FIG. 11B, a procedure of generating a pilot pattern with respect to a second antenna is illustrated. As described above with reference to FIG. 9, the pilot inserting position of the m-th OFDMA symbol may be determined as the c-th sub-carrier, the pilot inserting position of the n-th OFDMA symbol may be determined as the g-th sub-carrier, and the pilot inserting position of the o-th OFDMA symbol may be determined as the e-th sub-carrier.

FIG. 12A to FIG. 12D are diagrams illustrating a procedure of generating a pilot pattern when the number of antennas according to an embodiment of the present disclosure is four.

Figure 12A:
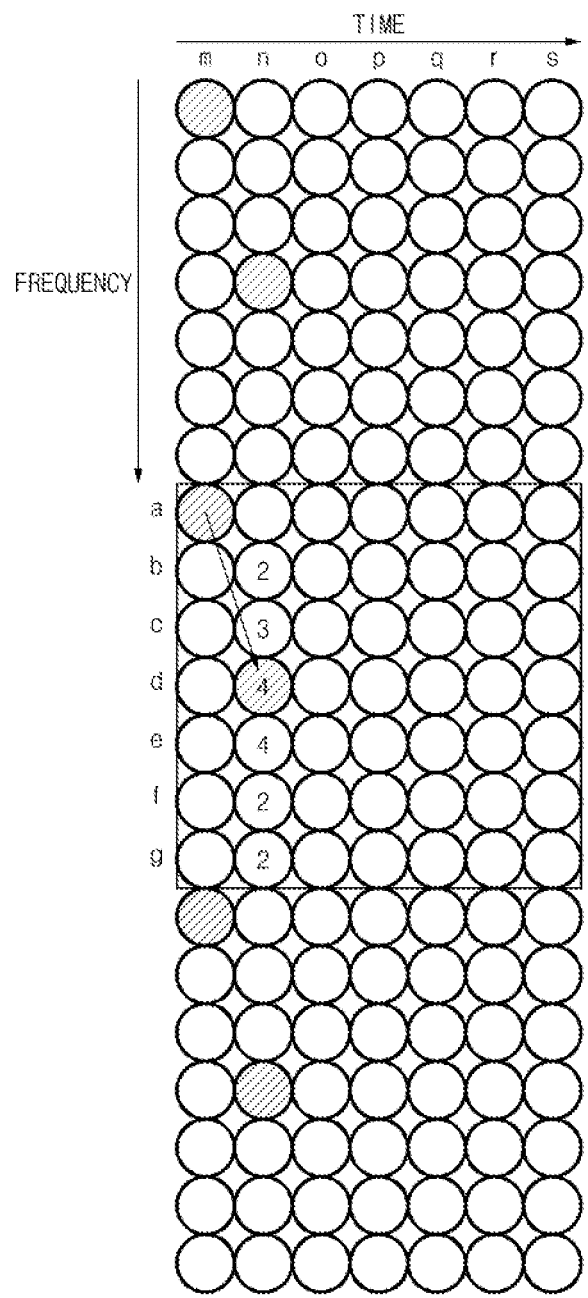
FIG. 12A to FIG. 12D are diagrams illustrating a procedure of generating a pilot pattern when the number of antennas according to an embodiment of the present disclosure is four.

First, referring to FIG. 12A, a procedure of generating a pilot pattern with respect to a first antenna is illustrated. For example, the pilot inserting position of the m-th OFDMA symbol may be determined as the a-th sub-carrier which is an optional sub-carrier position. The pilot inserting position of the n-th OFDMA symbol may be determined as the d-th sub-carrier which is one of the d-th and e-th subcarriers having the largest minimum distance of the frequency-time distance from the pilot inserting position of the m-th OFDMA symbol.

Figure 12B:
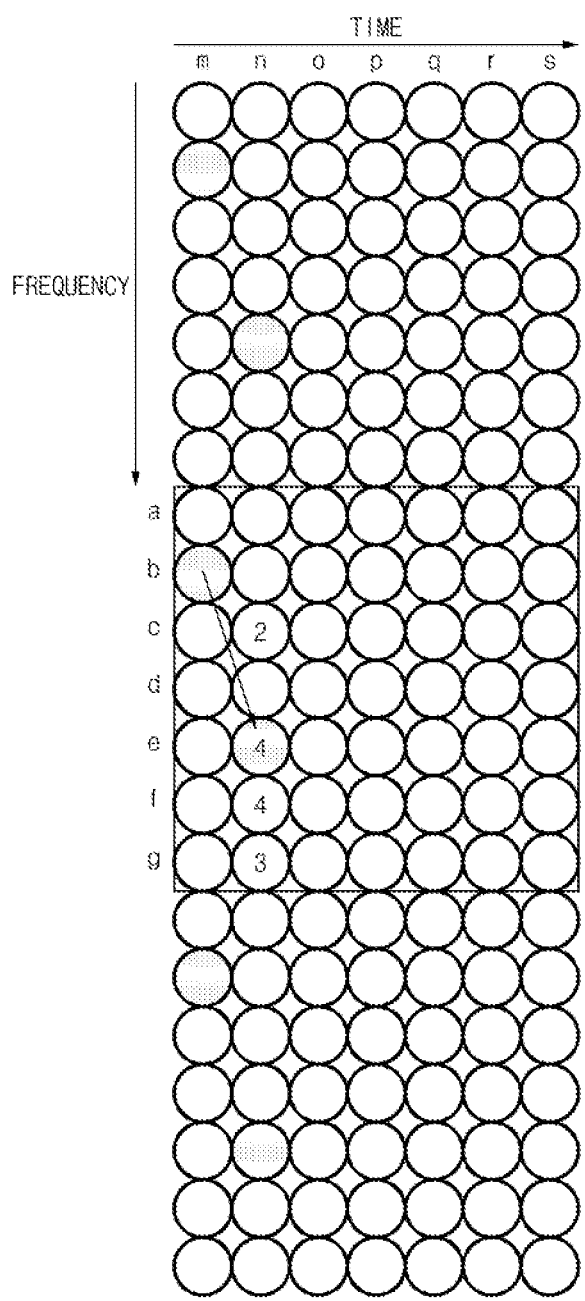

Referring to FIG. 12B, a procedure of generating a pilot pattern with respect to a second antenna is illustrated. The pilot inserting position of the m-th OFDMA symbol may be determined as one optional sub-carrier among b-th, c-th, e-th, f-th, and g-th sub-carriers except for the pilot inserting position of the first antenna. FIG. 12B illustrates that the pilot inserting position of the m-th OFDMA symbol may be determined as the b-th sub-carrier. The pilot inserting position of the n-th OFDMA symbol may be determined as the e-th sub-carrier which is one of the e-th and f-th sub-carriers having the largest minimum distance of the frequency-time distance from the pilot inserting position of the m-th OFDMA symbol among the c-th, e-th, f-th, and g-th sub-carriers except for the pilot inserting position of the m-th OFDMA symbol and the pilot inserting position of the first antenna.

Figure 12C:
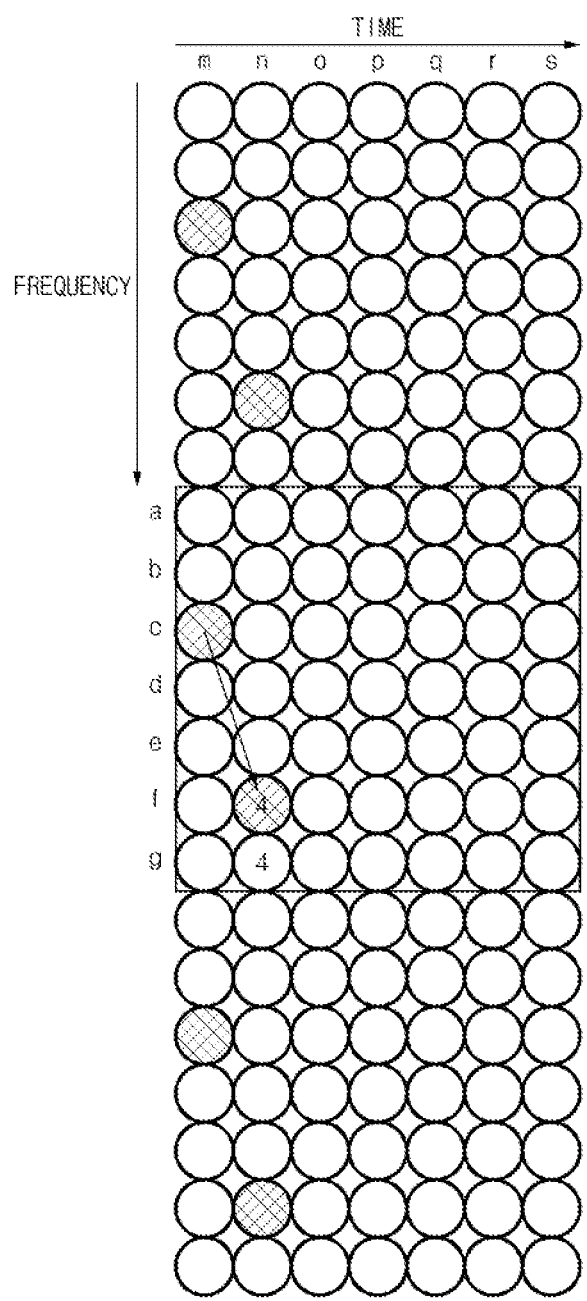

Referring to FIG. 12C, a procedure of generating a pilot pattern with respect to a third antenna is illustrated. The pilot inserting position of the m-th OFDMA symbol may be determined as one optional sub-carrier among the c-th, f-th, and g-th sub-carriers except for the pilot inserting positions of the first antenna and the second antenna.

FIG. 12C illustrates that the pilot inserting position of the m-th OFDMA symbol may be determined as the c-th sub-carrier. The pilot inserting position of the n-th OFDMA symbol may be determined as the f-th sub-carrier which is one of (as the frequency-time distances of the f-th and the g-th sub-carriers are same f-th and g-th sub-carriers) except for the pilot inserting position of the m-th OFDMA symbol, the pilot inserting position of the first antenna, and the pilot inserting position of the second antenna.

Figure 12D:
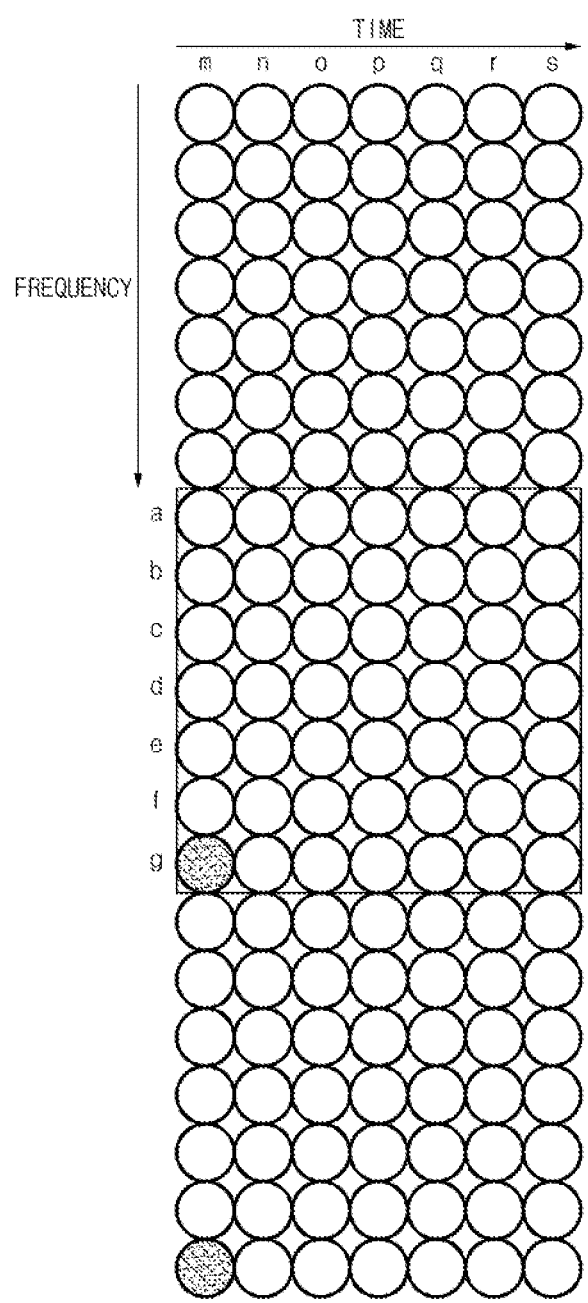

Referring to FIG. 12D, a procedure of generating a pilot pattern with respect to a fourth antenna is illustrated. In a case of the fourth antenna, the g-th sub-carrier except for the pilot inserting position of the first to third antennas may be determined as the pilot inserting position.

Figure 13:
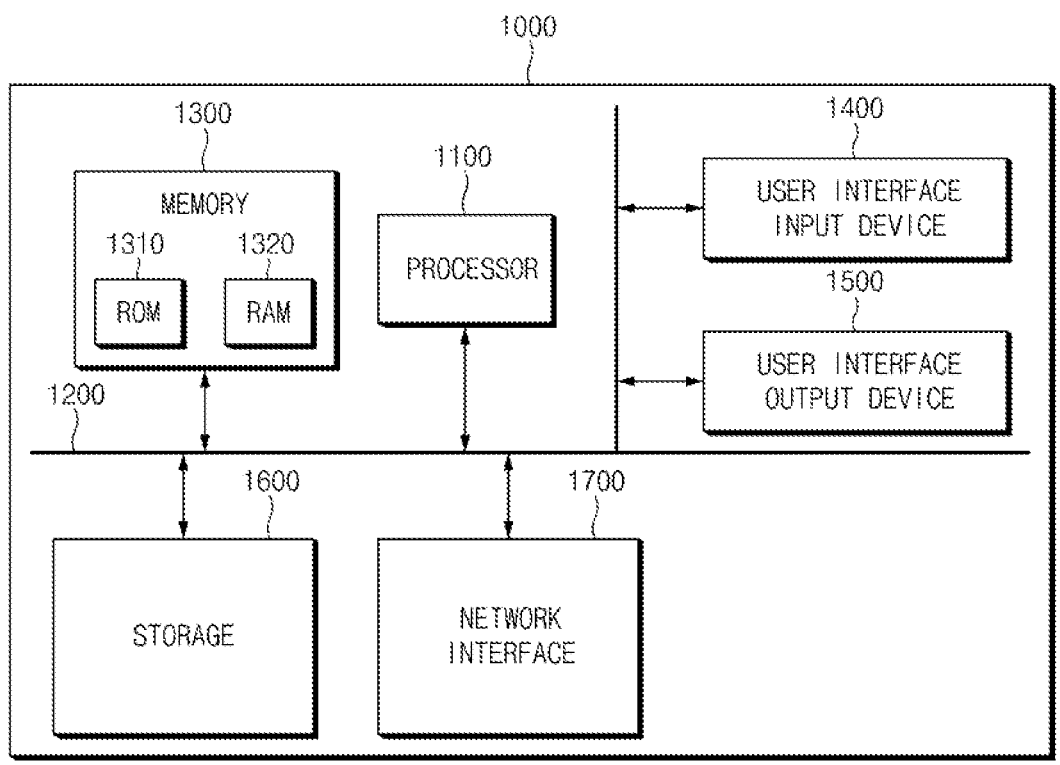
FIG. 13 is a block diagram illustrating a computing system for executing the method of generating a pilot pattern for MIMO antennas according to an embodiment of the present disclosure.

FIG. 13 is a block diagram illustrating a computing system for executing the method of generating a pilot pattern for MIMO antennas according to an embodiment of the present disclosure.

Referring to FIG. 13, the computing system 1000 may include at least one processor 1100, a memory 1300, a user interface input device 1400, a user interface output device 1500, a storage 1600, and a network interface 1700 which are connected to each other through a system bus 1200.

The processor 1100 may be a semiconductor device for executing processing of commands stored in a central processing unit (CPU), or the memory 1300 and/or the storage 1600. The memory 1300 and the storage 1600 may include various types of volatile or non-volatile storage media. For example, the memory 1300 may include a Read Only Memory (ROM) and a Random Access Memory (RAM). Accordingly, the method or the steps of algorithm according to an embodiment of the present disclosure may be directly implemented by a hardware, a software module, or a combination of the two executed by a processor 1100. The software module may reside in a storage medium (i.e., in the memory 1300 and/or the storage 1600) such as a RAM memory, a flash memory, a ROM memory, an EPROM memory, an EEPROM memory, a register, a hard disk, a removable disk, and CD-ROM. The exemplary storage medium may be coupled to a processor 1100, and the processor 1100 may read information from the storage medium and write information to the storage medium. Alternatively, the storage medium may be integrated in the processor 1100. The processor and the storage medium may reside in an application specific integrated circuit (ASIC). The ASIC may reside in a user terminal. Alternatively, the processor and the storage medium may reside in the user terminal as an individual component.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for generating a pilot pattern for MIMO antennas including at least a first antenna and a second antenna, the method comprising:
   determining, using a processor, a size of a slot that is an interval where the pilot pattern is repeated in a time domain and a frequency domain;
   determining, using a processor, first pilot inserting positions of OFDMA symbols included in a slot determined for the first antenna; and
   determining, using a processor, second pilot inserting positions of OFDMA symbols included in a slot determined for the second antenna, the second pilot inserting positions having sub-carriers different from sub-carriers of the first pilot inserting positions,
   wherein the pilot pattern includes the first pilot inserting positions and the second pilot inserting positions,
   wherein the first pilot inserting positions indicate four OFDMA symbols in the slot determined for the first antenna, sub-carrier positions for the respective four OFDMA symbols are differently configured from each other, and
   wherein the second pilot inserting positions indicate three OFDMA symbols in the slot determined for the second antenna, sub-carrier positions for the respective three OFDMA symbols are differently configured from each other.

2. The method of claim 1, wherein determining the second pilot inserting positions comprises:

determining a reference pilot inserting position of a first OFDMA symbol included in the slot determined for the second antenna; and determining the second pilot inserting positions of the other OFDMA symbols than the first OFDMA symbol included in the slot determined for the second antenna based on the reference pilot inserting position.

3. The method of claim 2, wherein the reference pilot inserting position has a sub-carrier different from a sub-carrier of a first pilot inserting position of a first OFDMA symbol included in the slot determined for the first antenna.

4. The method of claim 2, wherein determining the second pilot inserting positions of the other OFDMA symbols comprises:

calculating a frequency-time distance to respective residual sub-carriers from pilots of all previous OFDMA symbols in the slot determined for the second antenna to determine a pilot inserting position of a current OFDMA symbol after the first OFDMA symbol in the slot determined for the second antenna, the respective residual sub-carriers being sub-carriers except for sub-carriers into which the pilots of all previous OFDMA symbols in the slot determined for the second antenna are inserted and the sub-carriers of the first pilot inserting positions;

comparing minimum frequency-time distances in frequency-time distance sets of the residual sub-carriers with each other, each of the frequency-time distance sets including frequency-time distances from the pilots of all previous OFDMA symbols in the slot determined for the second antenna to each of the residual sub-carriers; and determining, among the residual sub-carriers, a sub-carrier having a largest minimum frequency-time distance as the pilot inserting position of the current OFDMA symbol.

5. The method of claim 4, wherein, until only one sub-carrier having the largest minimum frequency-time distance is provided, comparing the minimum frequency-time distances in the frequency-time distance sets of the residual sub-carriers with each other is repeated from a first minimum frequency-time distance to a final minimum frequency-time distance in each frequency-time distance set, and next minimum frequency-time distances are compared with each other with respect to sub-carriers having a same largest minimum frequency-time distance.

6. The method of claim 5, wherein the first minimum frequency-time distance is a minimum value in the frequency-time distance set, and the final minimum frequency-time distance is a maximum value in the frequency-time distance set.

7. The method of claim 4, further comprising:

calculating, using a processor, a frequency distance to respective sub-carriers having a same largest minimum frequency-time distance in a frequency direction from the pilots of all previous OFDMA symbols in the slot determined for the second antenna, when there are at least two sub-carriers having the same largest minimum frequency-time distance even in a case of comparing final minimum frequency-time distances in the frequency-time distance sets;

comparing, using a processor, minimum frequency distances in frequency distance sets with each other, each of the frequency distance sets including frequency distances from the pilots of all previous OFDMA symbols in the slot determined for the second antenna to each of the sub-carriers having the same largest minimum frequency-time distance; and determining, using a processor, a sub-carrier having the largest minimum frequency distance as the pilot inserting position of the current OFDMA symbol.

8. The method of claim 7, wherein, until only one sub-carrier having the largest minimum frequency distance is provided, comparing the minimum frequency distances in the frequency distance sets with each other is repeated from a first minimum frequency distance to a final minimum frequency distance in each frequency distance set, and next minimum frequency distances are compared with each other with respect to sub-carriers having the same largest minimum frequency distance.

9. The method of claim 8, wherein the first minimum frequency distance in the frequency distance set is a minimum value in the frequency distance set, and the final minimum frequency distance in the frequency distance set is a maximum value in the frequency distance set.

10. The method of claim 8, further comprising determining, using a processor, one of sub-carriers having a same largest minimum frequency distance of the final minimum frequency distances in the frequency distance sets as the pilot inserting position of the current OFDMA symbol, when there are at least two sub-carriers having the same largest minimum frequency distance even in case of comparing the final minimum frequency distances in the frequency distance sets.

11. The method of claim 4, wherein the frequency-time distance is a sum of distances to a frequency direction and a time direction from each of the pilots of the previous OFDMA symbols to the respective residual sub-carriers.

12. An apparatus for generating a pilot pattern for MIMO antennas including at least a first antenna and a second antenna, the apparatus comprising:

a processor; and a storage medium having stored thereon instructions that, when executed, cause the processor to perform a method, the method comprising:

determining a size of a slot that is an interval where the pilot pattern is repeated in a time domain and a frequency domain;

determining first pilot inserting positions of OFDMA symbols included in a slot determined for the first antenna; and determining second pilot inserting positions of OFDMA symbols included in a slot determined for the second antenna, the second pilot inserting positions having sub-carriers different from sub-carriers of the first pilot inserting positions, wherein the pilot pattern includes the first pilot inserting positions and the second pilot inserting positions, wherein the first pilot inserting positions indicate four OFDMA symbols in the slot determined for the first antenna, sub-carrier positions for the respective four OFDMA symbols are differently configured from each other, and wherein the second pilot inserting positions indicate three OFDMA symbols in the slot determined for the second antenna, sub-carrier positions for the respective three OFDMA symbols are differently configured from each other.

13. The apparatus of claim 12, wherein determining the second pilot inserting positions comprises:

determining a reference pilot inserting position of a first OFDMA symbol included in the slot determined for the second antenna; and determining the second pilot inserting positions of the other OFDMA symbols than the first OFDMA symbol included in the slot determined for the second antenna based on the reference pilot inserting position.

14. The apparatus of claim 13, wherein the reference pilot inserting position has a sub-carrier different from a sub-carrier of a first pilot inserting position of a first OFDMA symbol included in the slot determined for the first antenna.

15. The apparatus of claim 13, wherein determining the second pilot inserting positions of the other OFDMA symbols comprises:
   calculating a frequency-time distance to respective residual sub-carriers from pilots of all previous OFDMA symbols in the slot determined for the second antenna to determine a pilot inserting position of a current OFDMA symbol after the first OFDMA symbol in the slot determined for the second antenna, the respective residual sub-carriers being sub-carriers except for sub-carriers into which the pilots of all previous OFDMA symbols in the slot determined for the second antenna are inserted and the sub-carriers of the first pilot inserting positions;
   comparing minimum frequency-time distances in frequency-time distance sets of the residual sub-carriers with each other, each of the frequency-time distance sets including frequency-time distances from the pilots of all previous OFDMA symbols in the slot determined for the second antenna to each of the residual sub-carriers; and
   determining, among the residual sub-carriers, a sub-carrier having a largest minimum frequency-time distance as the pilot inserting position of the current OFDMA symbol.

16. The apparatus of claim 15, wherein, until only one sub-carrier having the largest minimum frequency-time distance is provided, comparing the minimum frequency-time distances in the frequency-time distance sets of the residual sub-carriers with each other is repeated from a first minimum frequency-time distance to a final minimum frequency-time distance in each frequency-time distance set, and next minimum frequency-time distances are compared with each other with respect to sub-carriers having a same largest minimum frequency-time distance.

17. The apparatus of claim 15, wherein the first minimum frequency-time distance is a minimum value in the frequency-time distance set, and the final minimum frequency-time distance is a maximum value in the frequency-time distance set.

18. The apparatus of claim 15, wherein the method further comprises:
   calculating a frequency distance to respective sub-carriers having a same largest minimum frequency-time distance in a frequency direction from the pilots of all previous OFDMA symbols in the slot determined for the second antenna, when there are at least two sub-carriers having the same largest minimum frequency-time distance even in a case of comparing final minimum frequency-time distances in the frequency-time distance sets;
   comparing minimum frequency distances in frequency distance sets with each other, each of the frequency distance sets including frequency distances from the pilots of all previous OFDMA symbols in the slot determined for the second antenna to each of the sub-carriers having the same largest minimum frequency-time distance; and
   determining a sub-carrier having the largest minimum frequency distance as the pilot inserting position of the current OFDMA symbol.

19. The apparatus of claim 18, wherein, until only one sub-carrier having the largest minimum frequency distance is provided, comparing the minimum frequency distances in the frequency distance sets with each other is repeated from a first minimum frequency distance to a final minimum frequency distance in each frequency distance set, and next minimum frequency distances are compared with each other with respect to subcarriers having the same largest minimum frequency distance.

20. The apparatus of claim 19, wherein the first minimum frequency distance in the frequency distance set is a minimum value in the frequency distance set, and the final minimum frequency distance in the frequency distance set is a maximum value in the frequency distance set.

* * * * *